(12) United States Patent
Chauhan (10) Patent No.: US 11,924,261 B2
(45) Date of Patent: Mar. 5, 2024

(54) NETWORK PROTOCOL FOR ENABLING ENHANCED FEATURES FOR MEDIA CONTENT

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/070,293

(22) Filed: Nov. 28, 2022

(65) Prior Publication Data

US 2023/0088413 A1 Mar. 23, 2023

Related U.S. Application Data (63) Continuation of application No. 17/408,217, filed on Aug. 20, 2021, now Pat. No. 11,516,270.

(51) Int. Cl.
| | |
|---|---|
| *H04L 65/752* | (2022.01) |
| *H04L 65/1104* | (2022.01) |
| *H04L 65/65* | (2022.01) |
| *H04W 80/10* | (2009.01) |

(52) U.S. Cl.
CPC .......... *H04L 65/65* (2022.05); *H04L 65/1104* (2022.05); *H04L 65/752* (2022.05); *H04W 80/10* (2013.01)

(58) Field of Classification Search
CPC ..... H04L 65/65; H04L 65/1104; H04L 65/75; H04W 80/10

USPC .......................................................... 709/231
See application file for complete search history.

(56) References Cited

U.S. PATENT DOCUMENTS

| | | |
|---|---|---|
| 7,047,302 B1 | 5/2006 | Chatani et al. |
| 7,296,074 B2 | 11/2007 | Jagels |
| 7,346,920 B2 | 3/2008 | Lamkin et al. |
| 7,461,067 B2 | 12/2008 | Dewing et al. |
| 7,995,756 B1 | 8/2011 | Mckinney et al. |
| 8,073,900 B2 | 12/2011 | Guedalia et al. |
| 8,166,384 B1 | 4/2012 | Kaplan et al. |
| 8,244,707 B2 | 8/2012 | Lin et al. |

(Continued)

FOREIGN PATENT DOCUMENTS

| | | |
|---|---|---|
| EP | 1506468 A2 | 2/2005 |
| JP | 6448046 B2 | 1/2019 |

(Continued)

*Primary Examiner* — Glenford J Madamba
(74) *Attorney, Agent, or Firm* — Perkins Coie LLP (57) ABSTRACT

A web server provides media content for playback on client devices that is associated with a set of enhanced features. When enabled, each enhanced feature provides functionality associated with and supplemental to the media content. The web server performs a handshake with each of a plurality of client devices to authenticate a communication channel. The web server enables one or more of the enhanced features while delivering media content for playback on a first device if information exchanged in the handshake with the first device satisfies a first criterion. The web server delivers the media content for playback on a second device, without enabling any of the enhanced features, if information exchanged in the handshake with the second device does not satisfy the first criterion.

20 Claims, 6 Drawing Sheets

(56) References Cited

U.S. PATENT DOCUMENTS

| | | |
|---|---|---|
| 8,260,877 B2 | 9/2012 | Biderman et al. |
| 8,296,393 B2 | 10/2012 | Alexander et al. |
| 8,396,055 B2 | 3/2013 | Patel et al. |
| 8,418,231 B2 | 4/2013 | Denny et al. |
| 8,838,149 B2 | 9/2014 | Hasek |
| 8,893,195 B2 | 11/2014 | Denny et al. |
| 9,203,816 B2 | 12/2015 | Brueck et al. |
| 9,237,311 B2 | 1/2016 | Raftelis et al. |
| 9,319,321 B2 | 4/2016 | Funge et al. |
| 9,357,272 B2 | 5/2016 | Oyman |
| 9,386,327 B2 | 7/2016 | La Joie et al. |
| 9,386,331 B2 | 7/2016 | Falls |
| 9,479,404 B2 | 10/2016 | Ladd et al. |
| 9,565,472 B2 | 2/2017 | Hybertson |
| 9,591,360 B2 | 3/2017 | Jennings et al. |
| 9,602,414 B2 | 3/2017 | Floyd et al. |
| 9,660,922 B2 | 5/2017 | Ramakrishnan |
| 9,706,257 B2 | 7/2017 | Piepenbrink et al. |
| 9,762,639 B2 | 9/2017 | Mcgowan et al. |
| 9,847,888 B2 | 12/2017 | Kannan et al. |
| 9,923,944 B2 | 3/2018 | White et al. |
| 9,948,985 B2 | 4/2018 | Ladd et al. |
| 10,349,104 B2 | 7/2019 | Phillips et al. |
| 10,397,648 B2 | 8/2019 | Howcroft et al. |
| 10,476,926 B2 | 11/2019 | Phillips et al. |
| 10,523,727 B2 | 12/2019 | Sehgal |
| 10,554,710 B2 | 2/2020 | Cho et al. |
| 10,601,838 B2 | 3/2020 | Hussain et al. |
| 10,701,119 B2 | 6/2020 | Oyman |
| 10,873,616 B1 | 12/2020 | Valz |
| 10,924,825 B2 | 2/2021 | Das et al. |
| 10,993,069 B2 | 4/2021 | Son et al. |
| 2002/0069218 A1 | 6/2002 | Sull et al. |
| 2002/0078144 A1 | 6/2002 | Lamkin et al. |
| 2004/0205811 A1 | 10/2004 | Grandy et al. |
| 2005/0210101 A1 | 9/2005 | Janik |
| 2006/0015637 A1 | 1/2006 | Chung |
| 2007/0047523 A1 | 3/2007 | Jiang |
| 2008/0123670 A1* | 5/2008 | Mundra ............... H04L 12/66 370/401 |
| 2008/0228777 A1 | 9/2008 | Sawant |
| 2008/0276289 A1 | 11/2008 | Stephanus |
| 2009/0132717 A1 | 5/2009 | Maes |
| 2011/0119738 A1 | 5/2011 | Piepenbrink et al. |
| 2011/0138018 A1 | 6/2011 | Raveendran et al. |
| 2012/0136725 A1 | 5/2012 | Alexander et al. |
| 2014/0047562 A1 | 2/2014 | Stepanov et al. |
| 2015/0039680 A1 | 2/2015 | Gallant et al. |
| 2016/0057481 A1 | 2/2016 | O'connor et al. |
| 2017/0311008 A1 | 10/2017 | Petersen |
| 2018/0352303 A1* | 12/2018 | Siddique ............. H04L 65/1069 |

FOREIGN PATENT DOCUMENTS

| | | |
|---|---|---|
| WO | 0210962 A1 | 2/2002 |
| WO | 2007101182 A2 | 9/2007 |
| WO | 2009120301 A2 | 10/2009 |
| WO | 2011123821 A1 | 10/2011 |
| WO | 2018027237 A1 | 2/2018 |
| WO | 2018104834 A1 | 6/2018 |
| WO | 2020148658 A2 | 7/2020 |
| WO | 2021032706 A1 | 2/2021 |

* cited by examiner

NETWORK PROTOCOL FOR ENABLING ENHANCED FEATURES FOR MEDIA CONTENT

CROSS-REFERENCE TO RELATED APPLICATIONS

This application is a continuation of U.S. patent application Ser. No. 17/408,217, filed on Aug. 20, 2021, entitled NETWORK PROTOCOL FOR ENABLING ENHANCED FEATURES FOR MEDIA CONTENT, which is hereby incorporated by reference in its entirety.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As communication technologies and network infrastructure have improved, communication networks have become able to support ever-increasing quantities of streaming media content such that streaming audio and video are now ubiquitous. The offerings of streaming content providers have expanded to take advantage of users' appetite for streaming content. However, while the expanding capabilities of user devices have made different types of media content accessible in different ways, streaming content providers have not been easily able to incorporate new ways of consuming media at least partially because communication networks are often still unable to support large-bandwidth applications. For example, while some networks may be able to support bandwidth-intensive applications, other networks will not have this capability. There is therefore a need to manage varying network capabilities in a way that enables content providers to offer expanded functionality and content types, while maintaining a quality of streaming services for customers connected to lower-bandwidth networks.

To solve these and other problems of existing systems, the inventors have conceived and reduced to practice a protocol, system, and computer-readable medium for enhancing web-based content. A web-based server, such as a media server, provides enhanced features to supplement content delivered over a network. These enhanced features, such as augmented reality content, virtual reality content, three-dimensional content, watch party functionality, a telecommunications layer, or a second viewing angle, are enabled for a client device if the network used by client device satisfies a specified criterion. For example, the web server enables one or more enhanced features if the network is a certain type of network (e.g., a 5G network) or if the network is operated by a certain mobile network operator. If the network used by the client device does not satisfy the criterion, the web server can deliver content without the enhanced features enabled. The web server can receive information about the network used by the client device during a handshake with the client device, such as a session initiation protocol (SIP) handshake, that is used to establish and authenticate a communication channel by which the web server delivers content to the client device. Based on the information exchanged in the handshake, the web server can deliver content with any of various types of content enhancements enabled when a network is able to support those enhancements, but otherwise maintain service associated with the primary content when the enhancements would reduce performance of the network or the web server.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

Figure 1:
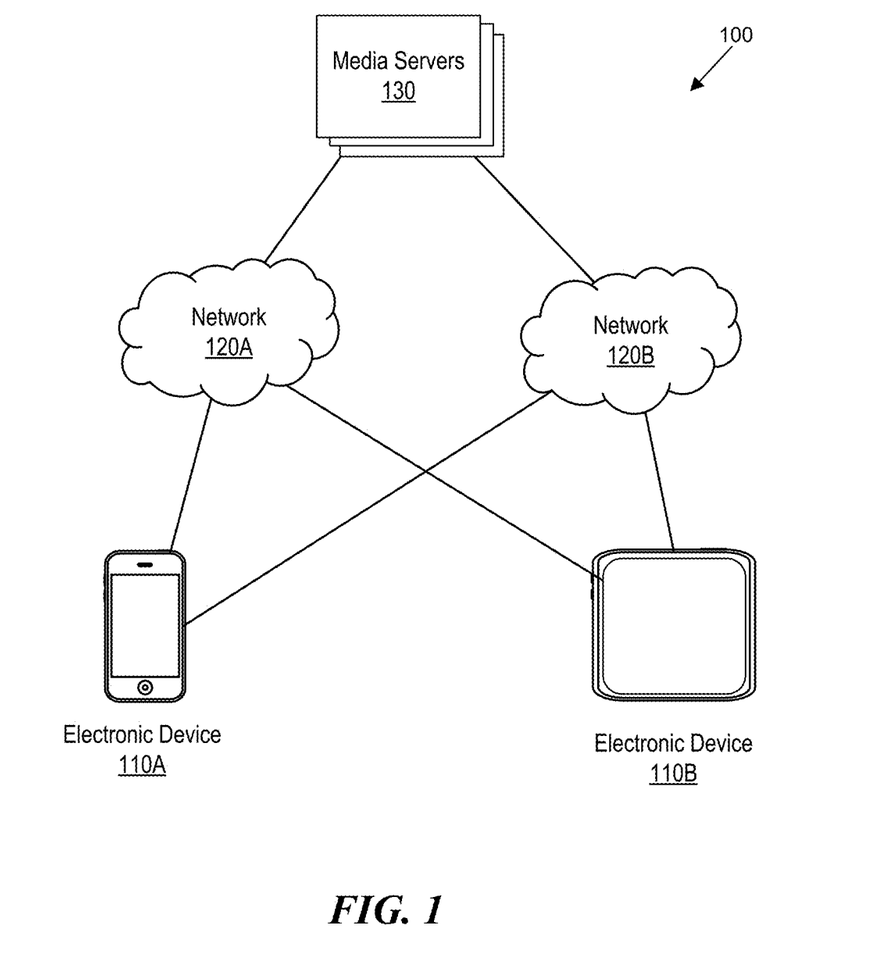
FIG. 1 is a block diagram that illustrates an environment in which some aspects of the disclosed technology operate.

FIG. 1 is a block diagram that illustrates an environment 100 in which some aspects of the disclosed technology operate. As shown in FIG. 1, the environment 100 includes one or more client devices 110 (such as a mobile phone, tablet computer, mobile media device, mobile gaming device, vehicle-based computer, wearable computing device, Internet-connected television, set-top box, etc.), one or more communications networks 120, and one or more media servers 130.

The client devices 110 include network communication components that enable the client devices to communicate with the media servers 130 or other portable electronic devices by transmitting and receiving wireless signals using licensed, semi-licensed or unlicensed spectrum over one or more of the communications networks 120. In some cases, each communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/

TDMA) mobile communications network, a 4th or 5th generation (4G/5G) mobile communications network (e.g., General Packet Radio Service (GPRS/EGPRS), Enhanced Data rates for GSM Evolution (EDGE), Universal Mobile Telecommunications System (UMTS), Long Term Evolution (LTE), or New Radio (NR)), or other types of communications networks.

Various components within the client devices 110 enable the devices to communicate by one or more types of the communications networks 120. For example, a mobile device may be configured to communicate over a GSM mobile telecommunications network. As a result, the mobile device may include a Subscriber Identity Module (SIM) card that stores an International Mobile Subscriber Identity (IMSI) number that is used to identify the mobile device on the GSM mobile communications network or other networks, for example, those employing 3G and/or 4G wireless protocols. If the mobile device is configured to communicate over another communications network, the mobile device may include other components that enable it to be identified on the other communications networks.

In FIG. 1, the communications network 120A can represent a different type of network than the communications network 120B. Some client devices 110 can be configured to communicate over one or both types of networks. For example, the communications network 120A is a 4G network while the communications network 120B is a 5G network, and the electronic device 110A switches between the 4G network 120A and the 5G network 120B based on availability of each network (e.g., due to geographic limitations of the networks). Other types of client devices 110 may be configured to communicate over some types of network and not others. For example, if the electronic device 110B is configured for 4G network access but not configured for 5G network access, the electronic device 110B communicates with the media servers 130 over a 4G network but not a 5G network.

The media servers 130 store media content for access by the client devices 110. In various implementations, the media servers 130 each represent one or more computing devices, one or more nodes in a cloud-based architecture, and/or one or more nodes in a content distribution network. The media servers 130 receive requests for content from the client devices 110 and distribute the requested content in response. Any of a variety of types of media content can be accessed via the media servers 130, including, in various implementations, streaming video, streaming audio, or images.

The media content stored by the media servers 130 is associated with a set of enhanced features that, when enabled, provide functionality corresponding to and supplementing the media content. One example type of enhanced feature is a transformation of the media content into artificial reality (AR), virtual reality (VR) content, or three-dimensional content, or the addition of AR or VR content that is supplemental to the underlying media content. For example, when the media content is streaming video content, the streaming video can be output as AR or VR content when the enhanced feature is enabled, and output as traditional two-dimensional content when the enhanced features is not enabled. Similarly, the streaming video can be output as 3D content when the enhanced feature is enabled and output as two-dimensional content when the enhanced feature is not enabled. In other cases, AR or VR content associated with the streaming video can be output to a first device while the streaming video itself is output by a second device. Similarly, when the media content is static image content (such as an image of an article of furniture), an enhanced feature causes the client device to output the image as VR content (e.g., to allow a potential purchaser to view the appearance of the article of furniture in the purchaser's home). When the enhanced feature is not enabled, the image of the article of furniture can be displayed by the client device 110 as non-VR content.

Another type of enhanced feature that can be associated with media content is watch party functionality or a telecommunications layer, where multiple users can consume media content together and interact with each other via video, chat, phone calls, or other channels. In still other examples, the enhanced feature causes the user device to output surround sound audio, or provides another viewing angle for video content.

When a client device 110 requests access to the media content, the media servers 130 perform a handshake with the client device to authenticate a communication channel for delivering the media content to the client device. In some implementations, the handshake is a modified session initiation protocol (SIP) handshake to set up, and subsequently terminate, a communication session between the client device 110 and the media server 130 over which the media server can transmit media content. SIP is an application layer control protocol for creating, modifying, and terminating sessions with one or more users, where sessions include, for example, internet telephone calls or multimedia distribution. SIP is described in various technical specifications such as RFC-3261, which is incorporated herein by reference in its entirety. Generally, a SIP handshake communicates data to establish a session between parties, such as user location, user availability, user capabilities, session setup, and session management. In the modified SIP handshake according to implementations herein, the client device 110 additionally communicates an identifier of the network 120 to which the client device 110 is connected. For example, the client device 110 and media servers 130 exchange SIP messages with custom requests and responses. The opening line of a request contains a method that defines the request, and a Request-URI that defines where the request is to be sent. Similarly, the opening line of a response contains a response code that includes the additional capabilities available to the user for that session.

The handshake can additionally or alternatively include session description protocol (SDP) data units. For example, some types of media are transmitted via SDP payloads within SIP messages, and thus the SIP handshake to access such types of media include SDP data units. The SDP data units can include information such as media format, codec, and media communication protocol, as well as network information as described herein. The handshake between the client device 110 and the media server 130 can proceed according to or employ features of any of a variety of other protocols, including transport layer security (TLS), real-time transport protocol (RTP), or secure real-time transport protocol (SRTP).

The media servers 130 enable one or more of the enhanced features if the network information included in the handshake satisfies a specified criterion. In some implementations, the media servers 130 enable one or more enhanced features if the network 120 is a specified type of network, such as a 5G network. For example, since a 5G network likely has greater bandwidth and speeds than a 4G network, the 5G network can better support delivery of both the underlying media content and an additional feature without significantly reducing network performance. The media servers 130 can also receive information about the likelihood that the client device will remain connected to the specified type of network, enabling the enhanced feature if the client device is likely to be connected to the network for at least a threshold amount of time. For example, an operator of the network aggregates statistics and model predictions for likely network availability at any given location, likely network congestion at those locations, or similar data. When a client device is accessing the media servers 130, the network operator can identify current or predicted network attributes at the location of the client device in order for the network operator or the media server 130 to predict whether the client device will be connected to the network for at least the threshold amount of time. For example, if the client device is streaming video over a 5G network while traveling in a vehicle, the media server 130 may not enable an enhanced feature if the vehicle is likely to leave the geographic area covered by the 5G network in less than one minute. The criteria applied to enable enhanced features can be generated based on custom rules, for example defined by the media servers 130 or a network operator.

Other example criteria applied by the media servers 130 include determining if the network 120 is operated by a specified network operator. For example, a first network operator can partner with the operators of the media servers 130 to provide additional functionality to the customers of the first network operator, while customers of other network operators can access the media content but not the enhanced features. Furthermore, some implementations of the media servers 130 enable different enhanced features based on different network attributes. For example, one feature can be enabled when the network satisfies a first criterion (e.g., when the network is a first type), while another feature is enabled when the network satisfies a second criterion (e.g., when the network is a second type).

In some implementations, the media servers 130 enable enhanced features on one device based on another device satisfying a specified criterion. The media servers 130 can map one device to another device by identifying that both devices are used by the same user. For example, while streaming video content is played on a television, the media server 130 can retrieve a mobile phone number associated with the account of the streaming video subscriber to identify the user's mobile phone. Alternatively, the media server 130 can retrieve a mapping between multiple devices owned by the same user from a network operator or one or more third-party services. Once devices are mapped, the media servers 130 can use information about the network to which one device is connected to determine whether to enable enhanced features for media requested by another device. For example, when the criterion used to determine whether to enable enhanced features is an identity of a mobile network operator, the media server 130 enables enhanced features on a device connected to a different network (e.g., a television connected to a WiFi network) if the device is mapped to a mobile phone subscribed to the specified mobile network operator.

Enabling the enhanced features can include causing the corresponding client device 110 to display an indicator of the enabled feature. The user of the client device 110 can interact with the indicator if the user would like to access the functionality or content associated with the enhanced feature. Alternatively, the media server 130 can automatically cause the client device 110 to output the functionality or content associated with the enhanced feature if the enhanced feature is enabled, without requiring explicit input from the user. When an enhanced feature is enabled for a given device, the enhanced feature may not affect the delivery of the underlying media content itself. For example, in some cases, the frame rate and/or resolution of streaming video is the same regardless of whether the enhanced feature is enabled.

Wireless Communications System

Figure 2:
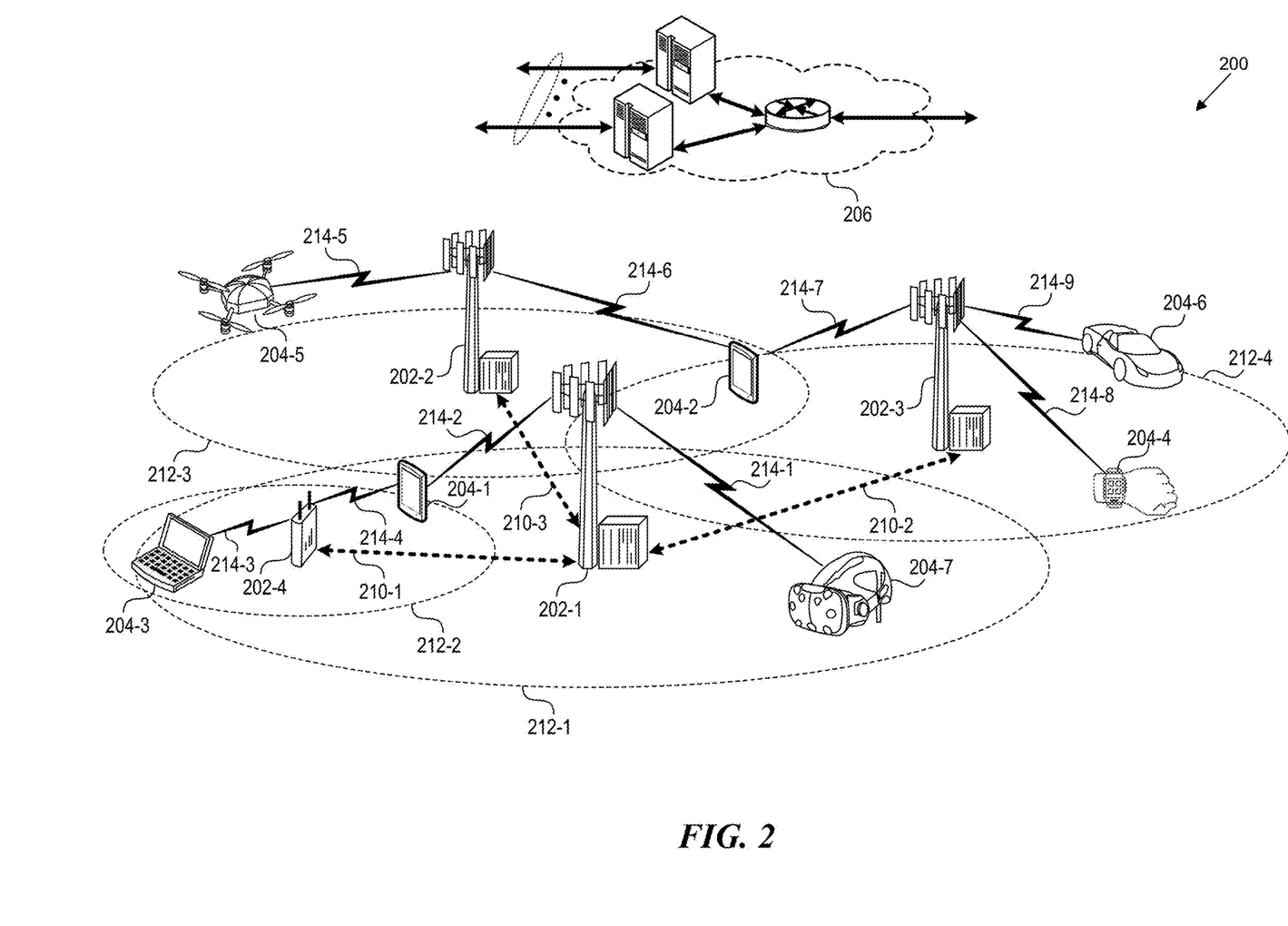
FIG. 2 is a block diagram that illustrates a wireless communications system.

FIG. 2 is a block diagram that illustrates an example wireless telecommunication network 200 ("network 200") by which some of the client devices 210 access media content. The network 200 includes base stations 202-1 through 202-4 (also referred to individually as "base station 202" or collectively as "base stations 202"). A base station is a type of network access node (NAN) that can also be referred to as a cell site, a base transceiver station, or a radio base station. The network 200 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 200 formed by the network 200 also include wireless devices 204-1 through 204-7 (referred to individually as "wireless device 204" or collectively as "wireless devices 204") and a core network 206. The wireless devices 204-1 through 204-7 can correspond to or include network 200 entities capable of communication using various connectivity standards. For example, a 5G communication channel can use millimeter wave (mmW) access frequencies of 28 GHz or more. In some implementations, the wireless device 204 can operatively couple to a base station 202 over a long-term evolution/long-term evolution-advanced (LTE/LTE-A) communication channel, which is referred to as a 4G communication channel.

The core network 206 provides, manages, and controls security services, user authentication, access authorization, tracking, Internet Protocol (IP) connectivity, and other access, routing, or mobility functions. The base stations 202 interface with the core network 206 through a first set of backhaul links (e.g., S1 interfaces) and can perform radio configuration and scheduling for communication with the wireless devices 204 or can operate under the control of a base station controller (not shown). In some examples, the base stations 202 can communicate with each other, either directly or indirectly (e.g., through the core network 206), over a second set of backhaul links 210-1 through 210-3 (e.g., X1 interfaces), which can be wired or wireless communication links.

The base stations 202 can wirelessly communicate with the wireless devices 204 via one or more base station antennas. The cell sites can provide communication coverage for geographic coverage areas 212-1 through 212-4 (also referred to individually as "coverage area 212" or collectively as "coverage areas 212"). The geographic coverage area 212 for a base station 202 can be divided into sectors making up only a portion of the coverage area (not shown). The network 200 can include base stations of different types (e.g., macro and/or small cell base stations). In some implementations, there can be overlapping geographic coverage areas 212 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 200 can include a 5G network 200 and/or an LTE/LTE-A or other network. In an LTE/LTE-A network, the term eNB is used to describe the base stations 202, and in 5G new radio (NR) networks, the term gNBs is used to describe the base stations 202 that can include mmW communications. The network 200 can thus form a heterogeneous network 200 in which different types of base stations provide coverage for various geographic regions. For example, each base station 202 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 200 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 200 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 200 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 204 and the base stations 202 or core network 206 supporting radio bearers for the user plane data. At the Physical (PHY) layer, the transport channels are mapped to physical channels.

As illustrated, the wireless devices 204 are distributed throughout the network 200, where each wireless device 204 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 204-1 and 204-2), a tablet computer, a laptop computer (e.g., wireless device 204-3), or a wearable (e.g., wireless device 204-4). A wireless device can be included in another device such as, for example, a drone (e.g., wireless device 204-5), a vehicle (e.g., wireless device 204-6), an augmented reality/virtual reality (AR/VR) device such as a head-mounted display device (e.g., wireless device 204-7), an IoT device such as an appliance in a home, a portable gaming console, or a wirelessly connected sensor that provides data to a remote server over a network.

A wireless device can communicate with various types of base stations and network 200 equipment at the edge of a network 200 including macro eNBs/gNBs, small cell eNBs/gNBs, relay base stations, and the like. A wireless device can also communicate with other wireless devices either within or outside the same coverage area of a base station via device-to-device (D2D) communications.

The communication links 214-1 through 214-9 (also referred to individually as "communication link 214" or collectively as "communication links 214") shown in network 200 include uplink (UL) transmissions from a wireless device 204 to a base station 202, and/or downlink (DL) transmissions from a base station 202 to a wireless device 204. The downlink transmissions can also be called forward link transmissions while the uplink transmissions can also be called reverse link transmissions. Each communication link 214 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 214 can transmit bidirectional communications using frequency division duplex (FDD) (e.g., using paired spectrum resources) or Time division duplex (TDD) operation (e.g., using unpaired spectrum resources). In some implementations, the communication links 214 include LTE and/or mmW communication links.

In some implementations of the network 200, the base stations 202 and/or the wireless devices 204 include multiple antennas for employing antenna diversity schemes to improve communication quality and reliability between base stations 202 and wireless devices 204. Additionally or alternatively, the base stations 202 and/or the wireless devices 204 can employ multiple-input, multiple-output (MIMO) techniques that can take advantage of multi-path environments to transmit multiple spatial layers carrying the same or different coded data.

Client Device

Figure 3A:
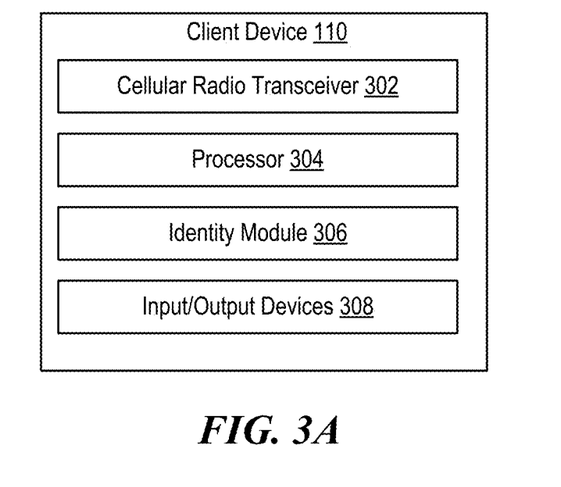
FIG. 3A is a block diagram illustrating components of an example client device.

FIG. 3A is a block diagram illustrating components of an example client device 110, implemented as a client device configured to communicate over a wireless telecommunications network. As shown in FIG. 3A, the client device 110 can include a cellular radio transceiver 302 that is able to communicate wirelessly with one or more external network devices according to one or more of a code division multiple access (CDMA) protocol, a global system for mobile communication (GSM) protocol, a long term evolution (LTE) protocol, a worldwide interoperability for microwave access (WiMAX) protocol, a new radio (NR) protocol, or another wireless telecommunications protocol. The client device 110 also includes a processor 304 and one or more input or output devices 308, such as a display device, a touchscreen display device, one or more buttons, or an interface to communicate with an external input or output device. As further shown in FIG. 3A, the client device 110 can include an identity module 306 that stores information to identify the client device 110 to a mobile network operator. Example implementations of the identity module 306 include removable or non-removable subscriber identity module (SIM)

card, a removable user identity module (R-UIM), or a universal integrated circuit card (U ICC).

Figure 3B:
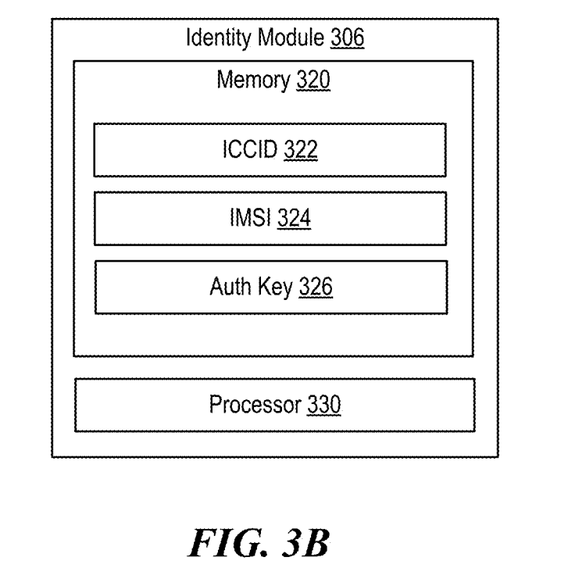
FIG. 3B illustrates an example implementation of an identity module within a client device.

FIG. 3B illustrates an example implementation of the identity module 306. The identity module 306 can include a memory 320 and a logic processor 330. The memory 320 stores various identifying information and authentication information, for example information identifying the identity module 306, identifying the subscriber, and/or identifying a mobile communication service provider and/or mobile communication network associated with the identity module 306. A phone number can be stored in the memory 320. In addition, the memory 330 can store an integrated circuit card identifier (ICCID) 332, an international mobile subscriber identity (IMSI) 324, and an authentication key 326. The IMSI may comprise a mobile country code (MCC), a mobile network code (MNC), and a mobile subscriber identification number (MSIN). The MCC and MNC identify a mobile communication network to which the client device 110 is subscribed, while the MSIN identifies the user of the client device 110 to the operator of the network. The processor 330 executes logic that enables external components to access the data stored in the memory 320 or protects the data from unauthorized access.

Delivering Enhanced Media Content

Figure 4:
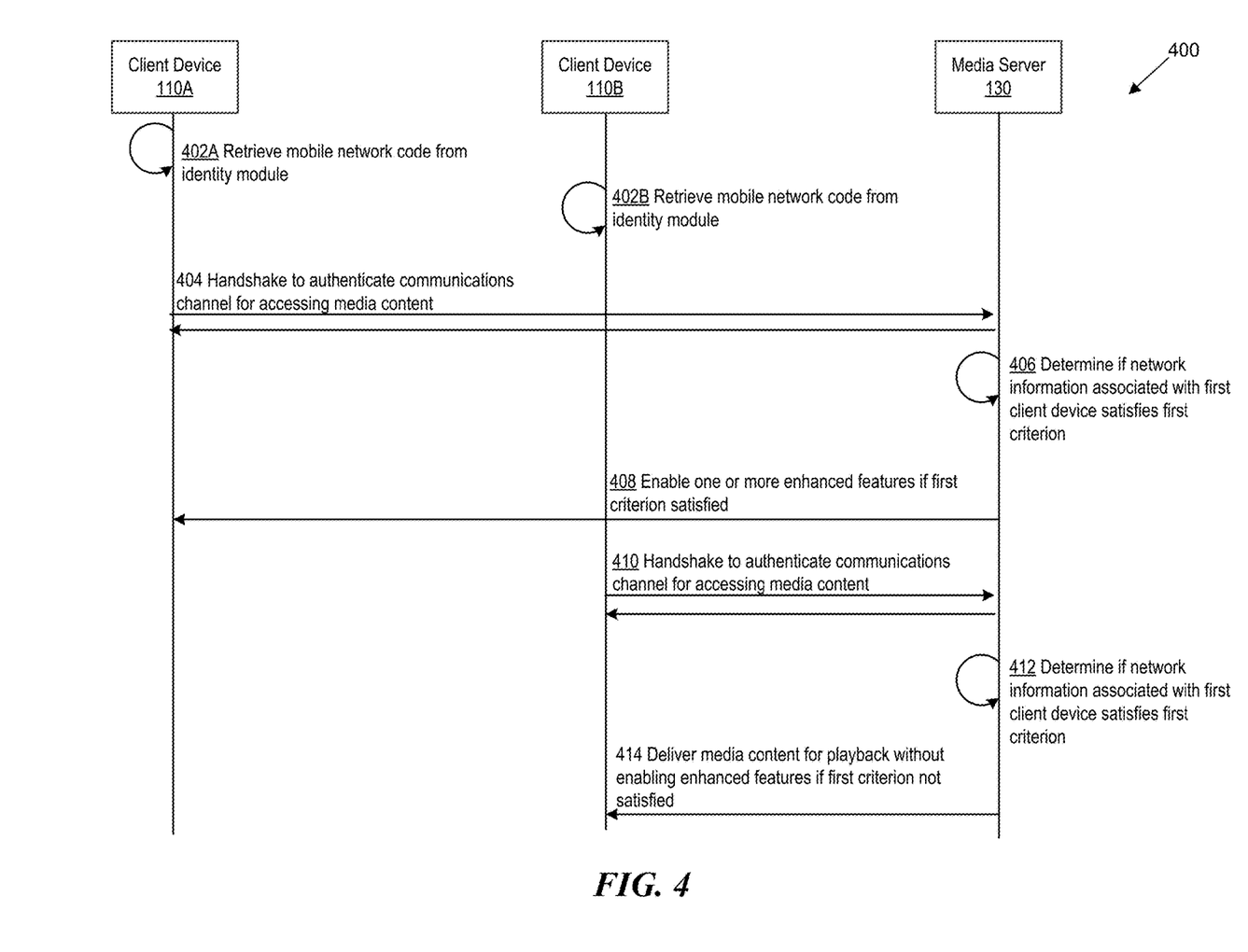
FIG. 4 is an interaction diagram that illustrates a process for delivering enhanced media content in a networking environment.

FIG. 4 is an interaction diagram that illustrates a process 400 for delivering enhanced media content in a networking environment, according to some implementations. As shown in FIG. 4, steps of the process can be performed by one or more client devices 110, such as a first client device 110A and a second client device 1106, as well as a media server 130. The client devices 110 and the media server 130 communicate with each other over at least one network. Other implementations of the process 400 can include additional, fewer, or different steps than those shown in FIG. 4, or can perform the steps in different orders.

At block 402A, the first client device 110A retrieves, from an identity module in the first device, an identifier or combination of identifiers for the user of the first device 110A, the mobile network to which the device is connected, and/or the mobile network operator associated with the mobile network to which the device is connected. The retrieved identifier can include, for example, a mobile country code (MCC), a mobile network code (MNC), and/or an IMSI. At block 402B, the second client device 1106 similarly retrieves an identifier or combination of identifiers from the identity module within the second client device 1106.

At block 404, the first client device 110A performs a handshake with the media server 130 to authenticate a first communication channel for accessing media content via the media server 130. During the handshake, the first client device 110A sends the media server 130 the identifier or combination of identifiers retrieved from the identity module. In some implementations, the handshake is a modified session initiation protocol (SIP) handshake that contains the identifier(s) retrieved from the identity module.

At block 406, the media server 130 determines whether information associated with the first client device 110A satisfies a first criterion of a set of one or more criteria. For example, the media server 130 determines if the first client device 110A is subscribed to a telecommunications network operated by a specific mobile network operator. As another example, the media server 130 determines if the first client device 110A is currently connected to a specific type of network, such as a 5G network, and/or is likely to continue to be connected to the specific type of network for at least a threshold amount of time. In still another example, the media server 130 retrieves an identifier of a user associated with the first client device 110A and maps the first client device to a third client device using the identifier of the user. For example, if the first client device 110A is an Internet-connected television, the media server 130 identifies, as the third client device, a mobile phone associated with the user of the television. The media server 130 then determines if a network used by the third client device satisfies the criterion (e.g., by determining if the mobile phone is subscribed to a particular mobile network operator), and enables one or more enhanced features on the first device 110A if the criterion is satisfied.

Figure 5A:
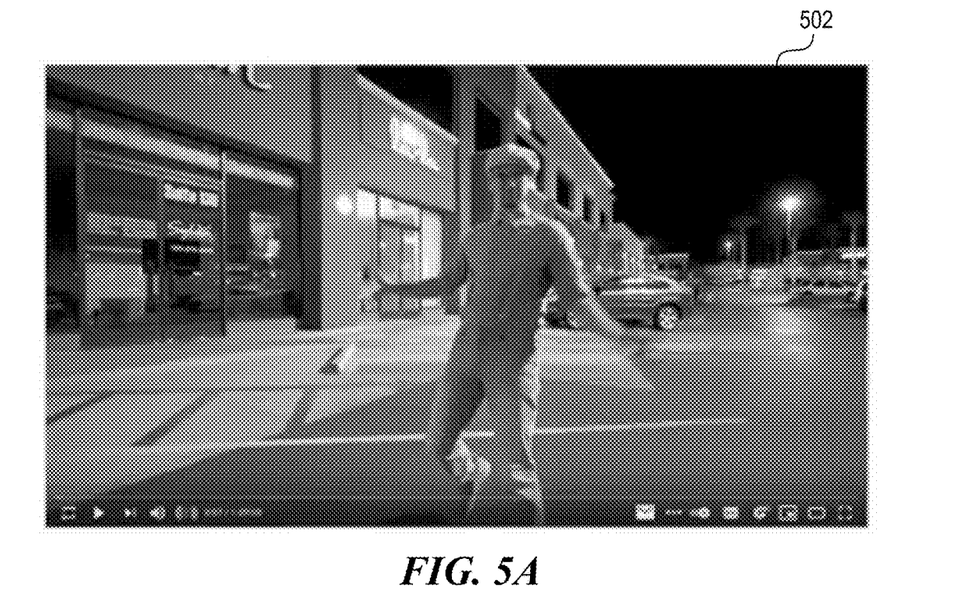
FIGS. 5A-5B illustrate example user interfaces for displaying streaming video content.
Figure 5B:
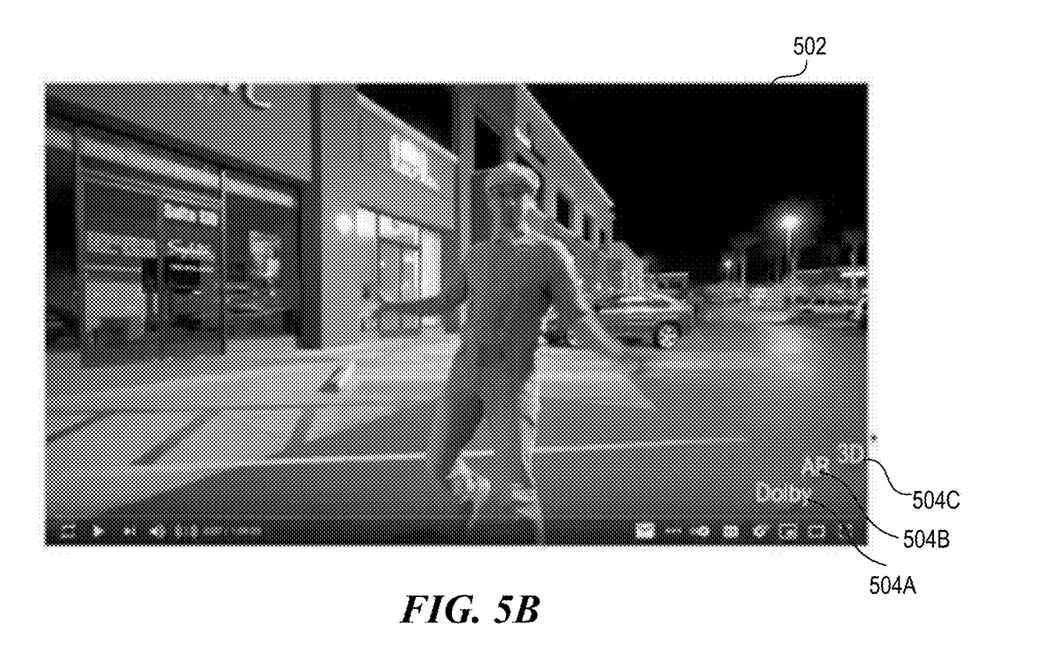

If the first criterion is satisfied, the media server 130 enables one or more enhanced features for the first client device 110A at block 408. The media server 130 can cause the first client device 110 to output an indicator of the enabled feature in association with the delivery of the media content requested by the first client device 110A. FIG. 5A illustrates, by way of example, streaming video 502 that is output by a client device 110A without any enhanced features, while FIG. 5B illustrates streaming video 502 output with three indicators 504 each corresponding to an enhanced feature that has been enabled. If the user of the first client device 110A selects one of the three indicators, the media server 130 can send the functionality or content associated with the selected feature for output by the first client device. For example, if the indicator 504A is selected, surround sound will be activated for the video. If the indicator 504B is selected, the video will be played as augmented reality content. If the indicator 504C is selected the video will be played as three-dimensional content. In some implementations, each of the indicators 504 is associated with an enhanced feature is enabled if the network associated with the first device 110A satisfies the first criterion. In other implementations, each enhanced feature is enabled if the network satisfies a corresponding criterion from the set of criteria. For example, the feature associated with the indicator 504A is enabled if the network satisfies the first criterion, the feature associated with the indicator 504B is enabled if the network satisfies second criterion, and the feature associated with the indicator 504C is enabled if the network satisfies a third criterion.

At block 410, the second device 1106 performs a handshake with the media server 130 to authenticate a second communication channel by which the second device is to receive content from the media server 130. The handshake performed at block 410 can be similar to the handshake performed by the first client device 110A at block 404. Likewise, the media server 130 determines, at block 412, whether the network information associated with the second client device 1106 satisfies any criterion in the set of criteria.

If the network information associated with the second client device 1106 does not satisfy any of the set of criteria, the media server 130 delivers media content to the second client device 1106 without enabling any enhanced features at block 414. For example, the media server 130 streams video content to the second client device 1106 without displaying any indicators of enhanced features, similar to the streaming video 502 shown in FIG. 5A.

Computer System

Figure 6:
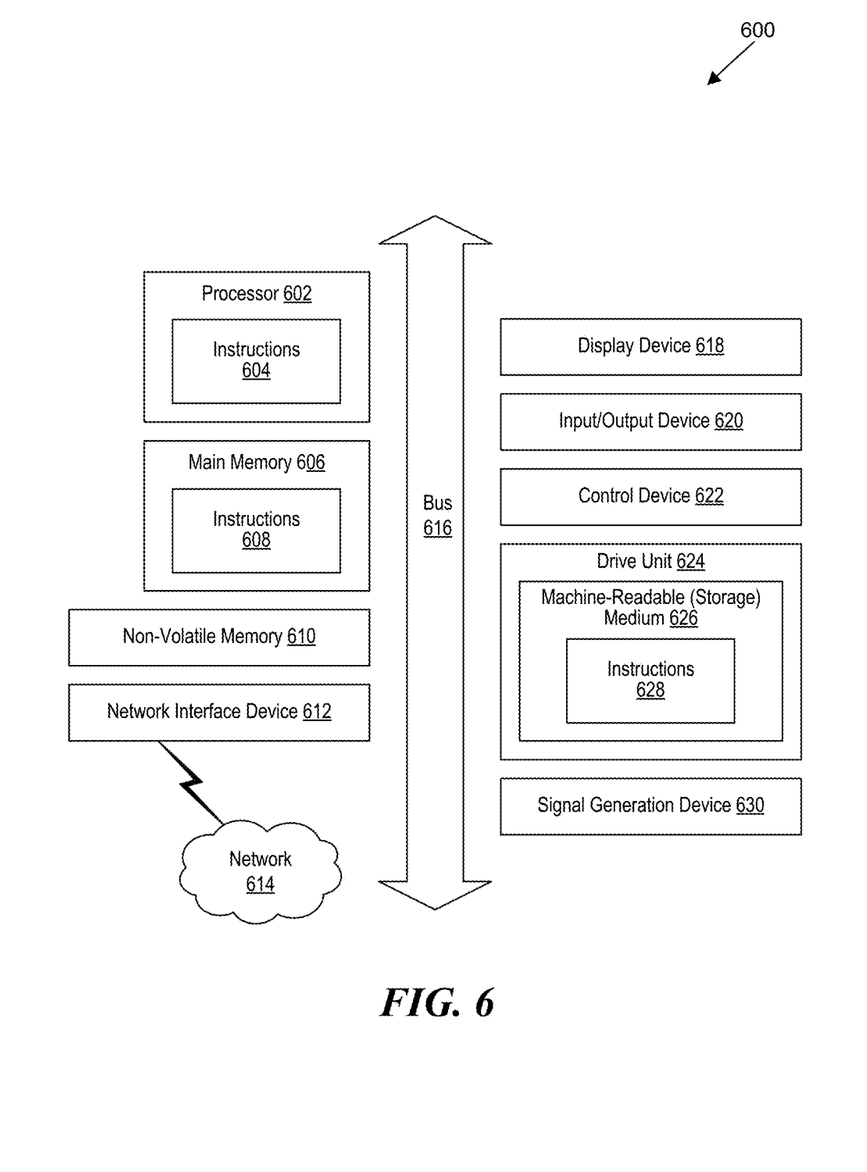
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:
   performing, by a web server, a handshake with a first client device that authenticates a communication channel that the first client device uses to access media content provided by the web server,
      wherein the handshake includes information about a first network that the first client device uses to request access to the media content; and
      wherein the media content is associated with a set of enhanced features that each provide functionality associated with and supplemental to the media content; and
   in response to determining that the information about the first network satisfies a criterion, sending to the first client device an indicator of one or more of the enhanced features in the set of enhanced features,
      wherein the indicator is associated with playback of the media content on the first client device, and
      wherein the indicator is selectable to cause the first client device to access the functionality associated with the one or more enhanced features.

2. The method of claim 1, further comprising:
   performing a handshake with a second client device that authenticates a communication channel that the second client device uses to access the media content;
      wherein the handshake includes information about a second network by which the second client device is requesting access to the media content; and
   in response to determining that the information about the second network does not satisfy the criterion, sending the media content for display by the second client device without the indicator.

3. The method of claim 2, wherein the media content comprises streaming video content, and wherein the method further comprises:
   delivering the streaming video content to the first client device and the second client device at a specified frame rate and resolution.

4. The method of claim 2, wherein the information about the first network and the information about the second network each comprises an identification of a type of network of the respective network, and wherein the method further comprises:
   determining the information about the first network satisfies the criterion in response to the first network being a first type of network; and
   determining the information about the second network does not satisfy the criterion in response to the second network being a second type of network.

5. The method of claim 4, wherein the first type of network is a 5th Generation (5G) network.

6. The method of claim 1, wherein performing the handshake with the first client device comprises:
   receiving, from the first client device, a mobile network code that is retrieved from an identity module in the first client device,
      wherein the indicator is sent for display by the first client device responsive to determining the mobile network code identifies the first network as being a mobile telecommunications network operated by a specified mobile network operator.

7. The method of claim 1, wherein the media content comprises streaming video content, and wherein the set of enhanced features includes one or more of: augmented reality content, virtual reality content, three-dimensional content, watch party functionality, a telecommunications layer, or a second viewing angle of the streaming video content.

8. The method of claim 1, wherein the handshake comprises a session initiation protocol (SIP) handshake.

9. At least one non-transitory computer-readable storage medium carrying instructions, which, when executed by at least one data processor of a system, cause the system to:
   perform a handshake with a client device that authenticates a communication channel that the client device uses to access media content provided by a web server,
      wherein the handshake includes information about a network ("network information") that the client device uses to request access to the media content; and
      wherein the media content is associated with a set of enhanced features that each provide functionality associated with the media content; and
   determine whether the network information satisfies a criterion;

when the network information satisfies the criterion, send to the client device content associated with the functionality of one or more of the enhanced features in the set of enhanced features, wherein the content associated with the functionality of the one or more enhanced features is displayable on the client device; and when the network information does not satisfy the criterion, send the media content without enabling any of the set of enhanced features.

10. The at least one non-transitory computer-readable storage medium of claim 9, wherein the network information comprises an identification of a type of network of the network, and wherein the instructions further cause the system to:

determine the network information satisfies the criterion when the network is a specified type of network.

11. The at least one non-transitory computer-readable storage medium of claim 9, wherein performing the handshake with the client device comprises:

receiving, from the client device, a mobile network code retrieved from an identity module in the client device,
wherein the content associated with the functionality of the one or more enhanced features is sent for display by the client device responsive to determining the mobile network code identifies the network as being a mobile telecommunications network operated by a specified mobile network operator.

12. The at least one non-transitory computer-readable storage medium of claim 9, wherein the media content comprises streaming video content, and wherein the set of enhanced features includes one or more of: augmented reality content, virtual reality content, three-dimensional content, watch party functionality, a telecommunications layer, or a second viewing angle of the streaming video content.

13. A system comprising:
at least one hardware processor; and
at least one non-transitory memory storing instructions, which, when executed by the at least one hardware processor, cause the system to:
receive, via a first network, a request from a first client device to access media content provided by a web server,
wherein the request includes information about the first network; and
wherein the media content is associated with an enhanced feature that provides functionality associated with and supplemental to the media content; and
in response to determining that the information about the first network satisfies a criterion, send to the first client device an indicator of the enhanced feature,
wherein the indicator is displayed in association with playback of the media content on the first client device; and
wherein the indicator is selectable to cause the first client device to access the functionality associated with the enhanced feature.

14. The system of claim 13, wherein the instructions further cause the system to:
receive, via a second network, a request from a second client device to access the media content;
wherein the request includes information about the second network; and
in response to determining the information about the second network does not satisfy the criterion, sending the media content for display by the second client device without the indicator.

15. The system of claim 14, wherein the media content comprises streaming video content, and wherein the instructions further cause the system to:
delivering the streaming video content to the first client device and the second client device at a specified frame rate and resolution.

16. The system of claim 14, wherein the information about the first network and the information about the second network each comprises an identification of a type of network of the respective network, and wherein the instructions further cause the system to:
determine the information about the first network satisfies the criterion in response to the first network being a first type of network; and
determine the information about the second network does not satisfy the criterion in response to the second network being a second type of network.

17. The system of claim 16, wherein the first type of network is a 5th Generation (5G) network.

18. The system of claim 13, wherein receiving the request from the first client device comprises:
receiving, from the first client device, a mobile network code retrieved from an identity module in the first client device,
wherein the indicator is sent for display by the first client device responsive to determining the mobile network code identifies the first network as being a mobile telecommunications network operated by a specified mobile network operator.

19. The system of claim 13, wherein the media content comprises streaming video content, and wherein the enhanced feature includes one or more of: augmented reality content, virtual reality content, three-dimensional content, watch party functionality, a telecommunications layer, or a second viewing angle of the streaming video content.

20. The system of claim 13, wherein the request is handshake comprises a session initiation protocol (SIP) handshake.

* * * * *